(No Model.)
D. M. JOHNSTON.
GANG PLOW.
No. 331,503. Patented Dec. 1, 1885.
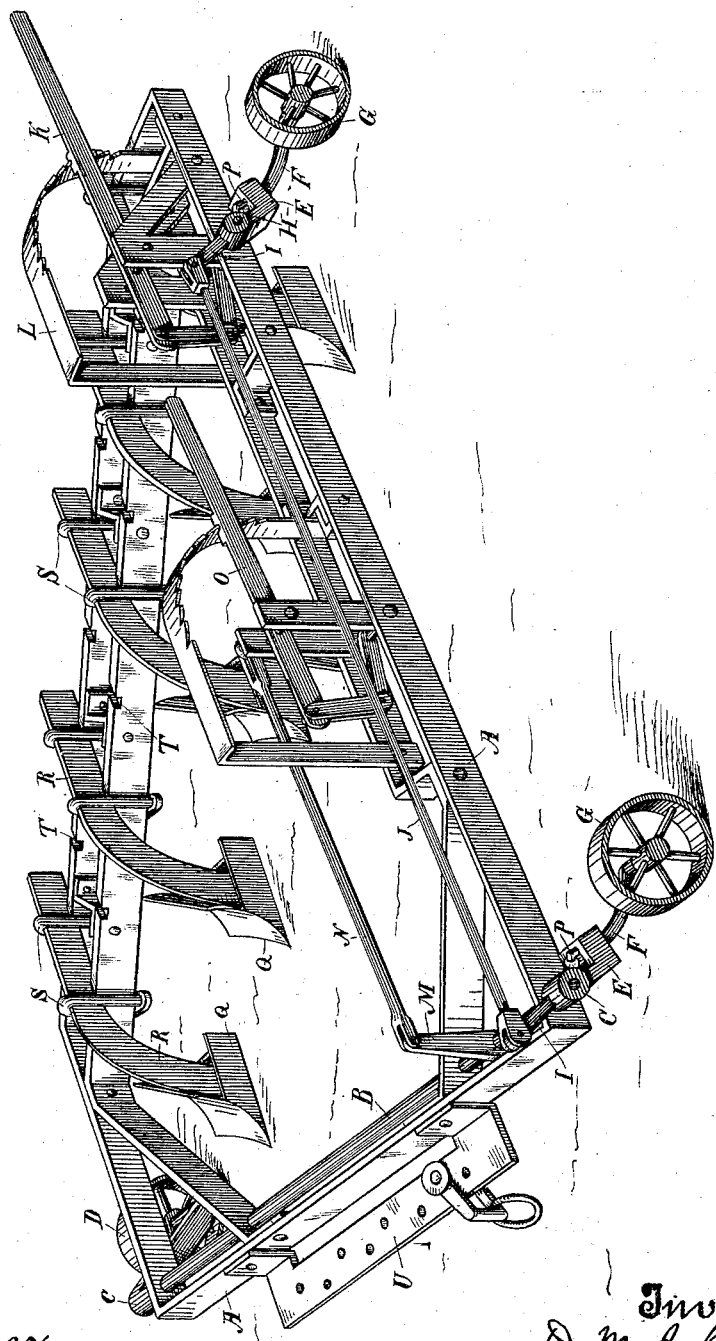
Witnesses,
Geo. H. Strong.
G. H. Rouse.
Inventor,
D. M. Johnston
By
Dewey & Co.
Attorneys

UNITED STATES PATENT OFFICE.

DAVID M. JOHNSTON, OF STOCKTON, CALIFORNIA.

GANG-PLOW.

SPECIFICATION forming part of Letters Patent No. 331,503, dated December 1, 1885.

Application filed September 19, 1885. Serial No. 177,625. (No model.)

*To all whom it may concern:*

Be it known that I, DAVID M. JOHNSTON, of Stockton, San Joaquin county, State of California, have invented an Improvement in Gang-Plows; and I hereby declare the following to be a full, clear, and exact description of the same.

My invention relates to certain improvements in gang-plows.

It consists in an improved construction of the standards, a means for securing them adjustably to the frame, and also relates to the wheels by which the plow-frame is supported, the means for raising and lowering either the front or rear plows or the whole line, and a means by which the wheels may be allowed to run as caster-wheels or by which they may be caused to turn on fixed axles.

It also consists in certain details of construction, all of which will be more fully explained by reference to the accompanying drawing, in which the figure is a perspective view of my plow.

A is the frame, which may be made of wood or, as shown in the present case, of iron. It is constructed in a form approximating that of a right-angled triangle, having one of the bases toward the front. Through the forward end of the frame is journaled a shaft, B, which has crank-arms C upon its opposite ends. For the purposes of this plow, the furrow-wheel D may turn upon a fixed axle projecting from the lower end of the crank-arm C upon that side, which arm is fixed to the shaft B. The crank-arms upon the opposite or land side each have a block formed with or secured to it, through which is made a hole to receive the shaft F of the caster-wheel G, the wheel turning upon an axle fixed to and projecting from the lower end of the shaft. The rear wheel G of the frame is mounted in a similar manner upon a crank-arm, H, secured to a short shaft which is journaled near the rear end of the frame. An arm, I, extends upwardly from the hubs of each of these crank-arms and above the shafts or axles to which they are connected, and these arms are united by a rod, J, so that the two crank-arms will be turned simultaneously. Another crank-arm extends forward from the shaft upon which the rear caster-wheel is supported, and this is connected by a link with a lever, K.

A rack, L, serves to hold this lever at any desired point. It will be seen that when the lever K is moved up or down it will act upon the crank-arms by which the two caster-wheels G and G are supported on the long side of the frame, and will thus depress or raise that side of the frame about these wheels. The forward shaft, B, has a crank-arm, M, extending upward from it, and this is connected by a rod, N, and links, as shown, with a lever, O, by which it may be turned, so as to raise or lower the opposite or furrow side of the frame about its caster-wheels D. By this construction it will be seen that the front end of the frame may be raised where there are a number of plows in the gang and the surface is uneven, so as to prevent the forward plows from plunging too deeply into the earth, and when they have passed the elevated portion this side may be depressed, so as to prevent these plows from skipping any low place without entering the soil at all. In the same manner the opposite or land side of the frame may be raised or lowered by the action of the lever K upon the connected caster-wheels G and G, so that the rear plows may be elevated or depressed. This arrangement is also useful at the ends where the furrows are completed. The front plows may be raised when they reach the end of the furrow, and the rear plows allowed to remain in the ground until they have completed the furrow. All the plows may then be raised, so that the apparatus can be turned around conveniently when desired. It will be manifest that in turning and at other times it will be desirable to have the wheels G and G turn loosely about their shanks, so as to act as caster-wheels, and provision is made for this, as heretofore described. When plowing upon side hills, however, the tendency of the apparatus will be to slide down hill to one side, and it is then necessary to fix the wheels G and G so that they will run in a line parallel with the long side of the frame A. In order to do this, a hole or keyway is made partly in the shanks and partly in the blocks E, and a key, P, is fitted to each of these, so that it may be introduced or removed at will. When the key is out of its seat, it is manifest that the shank can turn in the block E, and the wheel will become a caster-wheel, and when the key is introduced nto its seat the shank will be prevented from turning, and the wheel will then turn on a fixed shaft. The diagonal beam of the plow-frame is shown in the present case as being made of two plates of iron properly strengthened and braced and standing parallel with each other. The plows Q are secured to the plow-standards R, which, instead of being made concave or extending straight down or at the rear of the plow-frame, as in ordinary plows of this class, are made convex at the front, and above the plow-frame they are bent backward, so as to extend horizontally across the top of the diagonal portion of the frame, being secured thereto by the clamping-bolts S, which pass over the top of the plow-beams and extend down through or below the plow-frame, where they are secured by nuts or other convenient fastenings. By this construction the plows being pushed forward of the plow-beam and the frame are out of the way, so that weeds and trash will not have a tendency to collect upon the beam or between it and the frame, and thus choke and clog the plows. The horizontal portions of the plow-beams, which extend across the top of the frame, are fitted in grooves or channels, T, formed in the top of the plow-frame to receive them; and it will be manifest that the plows may be placed near together or farther apart, as may be desired, by simply loosening the fastenings of the clamping-bolts S and removing the plow-beams into another set of channels. By this construction a wide or narrow furrow may be made without any alteration in the plows, and by reducing the width of the furrow another plow may be introduced upon the same frame. If any plow should accidentally become broken or displaced, it may be removed and one of the outer plows substituted for it. To the front of the plow-frame a plate, U, is secured, having a number of holes made in it for the reception of the clevis, so that the draft may be regulated to suit the soil or the position of the plows. If desirable or necessary, diagonal braces may extend upward and backward from the back of each plow, as shown.

Having thus described my invention, what I claim as new, and desire to secure by Letters Patent, is—

1. In a gang-plow, the diagonally-arranged plow-supporting frame composed, essentially, of two portions suitably braced and standing parallel with each other, in combination with plows having their beams or standards bent and made convex, so as to carry the plows forward of the beam, and their upper portions horizontal, so as to extend across the beam and be secured within suitable grooves or channels in the frame by clamps or bolts, substantially as herein described.

2. The diagonally-arranged plow-supporting frame having grooves or channels formed in it, in combination with plows, the standards or beams of which extend across the beam and fit these channels, having their forward ends forming a convex outward curve and extending downward to the plows, which are supported in front of the beams, substantially as herein described.

3. In a gang-plow, the frame having the plows secured thereto, in combination with a shaft extending across the frame-front having a crank-axle secured to it and carrying the furrow-wheel, and two crank-axles upon the land side of the frame carrying independent wheels, said crank-arms being united, so as to be actuated by one lever, substantially as herein described.

4. In a gang-plow, the crank-arms mounted upon shafts and extending downwardly from the plow-frame, in combination with caster-wheels, suitable blocks or sockets through which the shanks of the caster-wheels loosely pass, and keys or wedges which lock the wheels and prevent their swiveling, as herein described.

In witness whereof I have hereunto set my hand.

DAVID M. JOHNSTON.

Witnesses:
GAETANO ALEGRETTI,
B. C. CRAWFORD.